United States Patent
Ito

(10) Patent No.: US 8,411,941 B2
(45) Date of Patent: Apr. 2, 2013

(54) COLOR PROCESSING APPARATUS AND METHOD THEREOF

(75) Inventor: Tadayuki Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/182,333

(22) Filed: Jul. 13, 2011

(65) Prior Publication Data

US 2012/0020551 A1    Jan. 26, 2012

(30) Foreign Application Priority Data

Jul. 26, 2010    (JP) ................. 2010-167475

(51) Int. Cl.
*G06K 9/00*    (2006.01)
(52) U.S. Cl. ........ 382/162; 382/165; 382/167; 382/232; 382/274
(58) Field of Classification Search .......... 382/162, 382/165, 167, 274, 232; 348/453; 345/589, 345/605, 553, 475, 441; 704/229, 222, 215, 704/240

See application file for complete search history.

(56) References Cited

U.S. PATENT DOCUMENTS

| 2004/0019278 A1* | 1/2004 | Abend .................. 600/454 |
| 2004/0146615 A1* | 7/2004 | McDonald et al. ........... 426/231 |
| 2006/0114528 A1 | 6/2006 | Ito .................. 358/525 |
| 2011/0299143 A1* | 12/2011 | Alessi et al. ................. 358/504 |

FOREIGN PATENT DOCUMENTS

| JP | 2006-157252 | 6/2006 |
| JP | 2009-38591 | 2/2009 |

* cited by examiner

*Primary Examiner* — Ali Bayat
(74) *Attorney, Agent, or Firm* — Fitzpatrick, Cella, Harper & Scinto

(57) ABSTRACT

A data division unit divides N components of N-dimensional vector signals to upper bit signals and lower bit signals. A vertex data read-out unit obtains output signals of a unit solid or unit hypersolid corresponding to a combination of the upper bit signals of the N components from a plurality of multi-dimensional LUT units used to divisionally store output signals corresponding to vertices of unit solids or unit hypersolids that configure a lookup table in eight-vertex units. An interpolation computing unit makes interpolation computations of output signals for N-dimensional vector signals based on the obtained output signals and the lower bit signals of the N components.

7 Claims, 14 Drawing Sheets

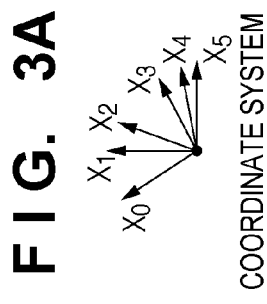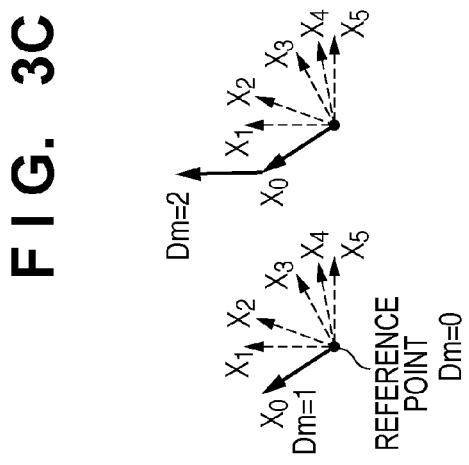

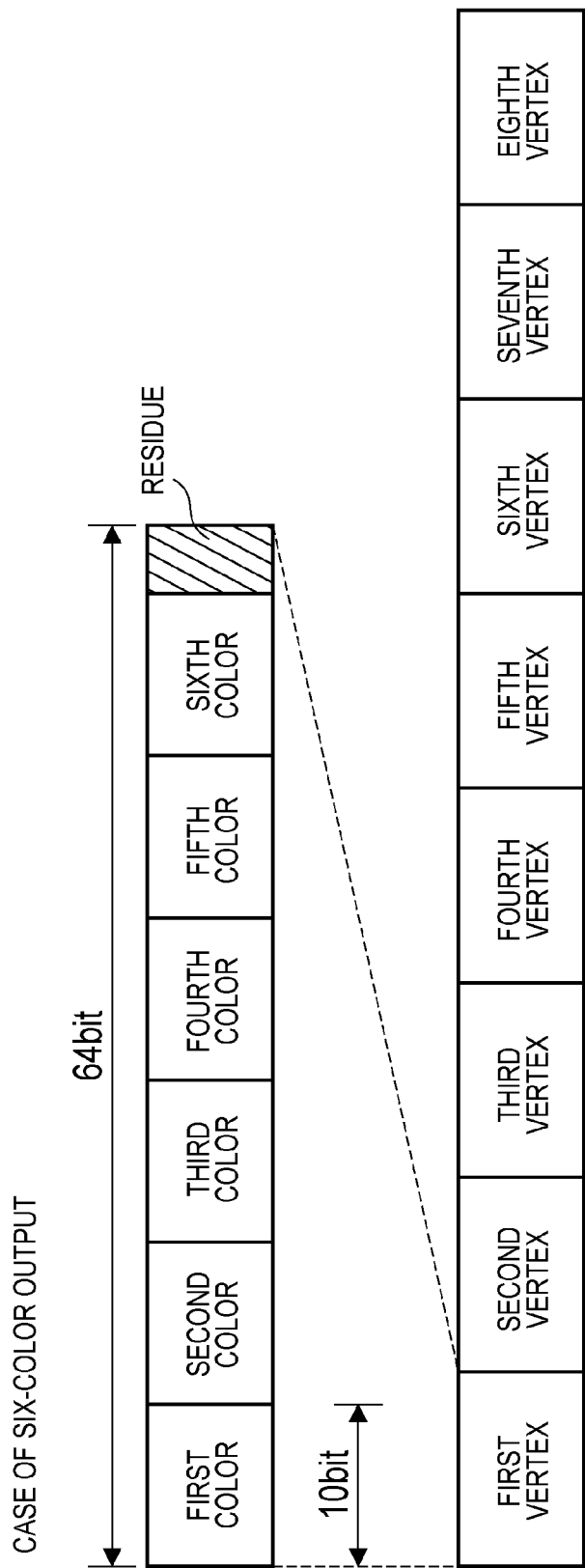

COLOR PROCESSING APPARATUS AND METHOD THEREOF

BACKGROUND OF THE INVENTION

1. Field of the Invention

The present invention relates to color processing and, more particularly, to a spectral color reproduction technique.

2. Description of the Related Art

When an image of an object captured by a digital camera is printed using a printer, the digital camera and printer respectively have unique color spaces. Therefore, when the captured image is transferred to and printed by the printer without any correction, the colors of a printed image do not often match those of the captured image or object.

In order to solve such color reproducibility problem between devices, processing for converting a color space of an input device onto that of an output device (to be referred to as color conversion hereinafter) is required. In general, input devices such as a digital camera, video camcorder, and scanner and output devices such as various kinds of printers using ink-jet, sublimation, and electrophotography systems incorporate a color conversion function so as to enhance their color reproduction performances (see Japanese Patent Laid-Open No. 2006-157252). Note that the color conversion of these devices is included in a colorimetric color reproduction technique.

However, with conventional color conversion, due to the influence of an illumination light source, object colors may match reproduction colors under a certain illumination light source, but often do not match under a different illumination light source.

In recent years, in the color management field, as a technique for minimizing the influence of environment light of, for example, an illumination light source, and reproducing more faithful colors, a spectral color reproduction technique has been examined. The spectral color reproduction technique handles spectral reflectances of an object, which do not depend on an illumination light source, as color information, and can control to match object colors and reproduction colors even when environment light has changed.

As one spectral color reproduction technique, a "multi-band input/output technique" is known (see Japanese Patent Laid-Open No. 2009-038591). This technique obtains spectral reflectances of an object by obtaining color information of four primary colors or more of the object in place of color reproduction based on three primary colors such as R, G, and B or C, M, and Y. Upon obtaining the spectral reflectances, when, for example, a visible range is sampled at wavelengths in increments of 10 nm, spectral reflectances become 36-dimensional data per wavelength (per color), and a spectral image obtained as a result of sampling has a huge data amount. Hence, a method of obtaining a spectral image with a smaller data amount has been proposed.

A spectral image undergoes principal component analysis to calculate principal component vectors of spectral reflectance data. Then, spectral reflectances are expressed using principal component vectors and principal component coefficients to calculate output signals according to values of the principal component coefficients, thus creating a lookup table (LUT) that associates the principal component coefficients with the output signals. As a result, principal component coefficients calculated from an input spectral image are input to the LUT, thus calculating corresponding output signals.

According to Japanese Patent Laid-Open No. 2009-038591, it is possible to finally reduce the aforementioned 36-dimensional spectral reflectance data to six-dimensional principal component coefficient data. Then, using a six-dimensional hypertetrahedron interpolation, desired output signals are derived from a six-dimensional LUT (6DLUT).

In the future, devices embedded in digital cameras and various printers will incorporate the spectral color reproduction technique. The invention of Japanese Patent Laid-Open No. 2009-038591 contributes to a data amount reduction. However, this literature does not examine any aspect of an embedded device which incorporates the spectral color reproduction technique. When the embedded device incorporates the six-dimensional hypertetrahedron interpolation disclosed by this literature, the following problem is posed.

A microprocessor (CPU) included in the embedded device does not always have a computing power as high as, for example, a high-end personal computer (PC) or supercomputer. Therefore, when the CPU of the embedded device executes the six-dimensional hypertetrahedron interpolation, calculations of output signal values according to a spectral image require an immense amount of time. In other words, it is not practical to implement the six-dimensional hypertetrahedron interpolation by software processing in consideration of the processing speed of the CPU.

On the other hand, when the six-dimensional hypertetrahedron interpolation is implemented by hardware, another problem is posed. For example, when table values obtained by dividing respective axes of six dimensions into eight are held in a 6DLUT, the total number of table values amounts to $8^6=262,144$. On the other hand, when table values obtained by dividing the respective axes into 16 are held, the total number of table values amounts to $16^6=16,777,216$. How to store such large quantities of table values in a memory included in the embedded device has to be further examined. Each unit hypersolid of this 6DLUT is configured by $2^6=64$ table values, and table values of seven points used in the six-dimensional hypertetrahedron interpolation are selected from these table values. However, there are 720 different combinations of table values of seven points, and a decent setup is required for hardware implementation in the embedded device.

On the other hand, the current embedded device incorporates a color conversion (a three-dimensional tetrahedral interpolation or four-dimensional hypertetrahedron interpolation) as a colorimetric color reproduction technique. When a six-dimensional hypertetrahedron interpolation is newly incorporated using hardware resources as small as possible, it is desirable to share hardware resources for the existing low-dimensional tetrahedron interpolation.

SUMMARY OF THE INVENTION

In one aspect, a method of making interpolation computations of output signals for $N(\geq 3$, an integer)-dimensional vector signals which represent an image using a lookup table and an N-dimensional tetrahedron interpolation or hypertetrahedron interpolation, the method comprising the steps of: dividing N components included in the N-dimensional vector signals into upper bit signals and lower bit signals; divisionally storing output signals corresponding to vertices of unit solids or unit hypersolids which configure the lookup table in eight-vertex units to a plurality of memories; controlling the plurality of memories to obtain output signals of vertices of the unit solid or the unit hypersolid corresponding to a combination of the upper bit signals of the N components; and making the interpolation computations of the output signals for the N-dimensional vector signals based on the obtained output signals and the lower bit signals of the N components.

According to the aspect, a high-dimensional hypertetrahedron interpolation can be executed using a circuit scale as small as possible. The high-dimensional hypertetrahedron interpolation and that of a low-dimensional tetrahedron interpolation can be executed using shared resources.

Further features of the present invention will become apparent from the following description of exemplary embodiments with reference to the attached drawings.

BRIEF DESCRIPTION OF THE DRAWINGS

FIGS. 3A to 3G are views for explaining an edge line selection method in a six-dimensional hypertetrahedron interpolation taking as an example a six-dimensional space.

FIGS. 8A to 8C are views for explaining vertex data formats required to implement hardware which performs a six-dimensional hypertetrahedron interpolation by the eight-division method of this embodiment.

DESCRIPTION OF THE EMBODIMENTS

Color processing according to embodiments of the present invention will be described in detail hereinafter with reference to the drawings.

First Embodiment

Overview

As a method of implementing a spectral color reproduction technique, the following method will be explained first. That is, data conversion results onto a color space of an output device are stored in advance in a memory as a lookup table (LUT). Then, input digital signals undergo a data conversion (color conversion) using the LUT, and data of the conversion results are output. In the data conversion using the LUT, interpolation computations are used together so as to reduce a memory size required to store the LUT. For input digital signals of three primary colors (three-dimensional vector signals), the data conversion is implemented using three-dimensional interpolation computations. For four-dimensional input digital signals (four-dimensional vector signals), the data conversion is implemented using four-dimensional interpolation computations. For digital signals expressed by six-dimensional principal component coefficients (six-dimensional vector signals), the data conversion is implemented using six-dimensional interpolation computations. That is, for digital signals of $N(\geq 3$, an integer) dimensions (N-dimensional vector signals), the data conversion is implemented using N-dimensional interpolation computations.

[Three-Dimensional Data Conversion]

Figure 1:
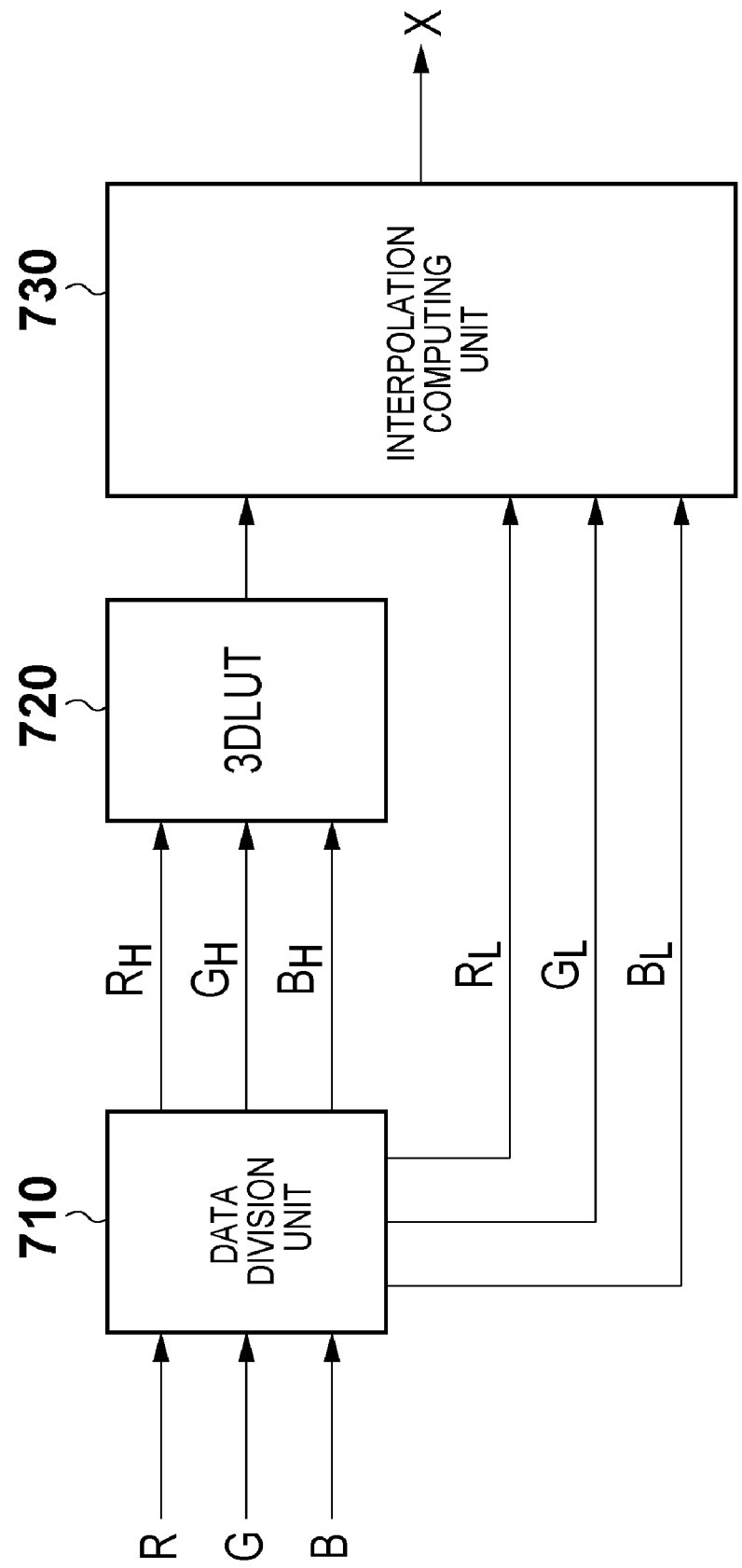
FIG. 1 is a block diagram for explaining a data conversion using a 3DLUT and three-dimensional interpolation computations for input digital signals of three primary colors.

A data conversion using a three-dimensional LUT (3DLUT) and three-dimensional interpolation computations for input digital signals of three primary colors will be described below with reference to the block diagram shown in FIG. 1.

A data division unit 710 divides input digital signals RGB into upper bits $R_H G_H B_H$ and lower bits $R_L G_L B_L$. A 3DLUT 720 outputs output signals of a plurality of vertices (to be referred to as vertex data or reference values) of a unit solid required for interpolation computations corresponding to the upper bits $R_H G_H B_H$. An interpolation computing unit 730 inputs the vertex data and lower bits $R_L G_L B_L$, and calculates interpolated values X to have the lower bits as weighting coefficients W by multiply-accumulating the weighting coefficients W and vertex data.

Figure 2A:
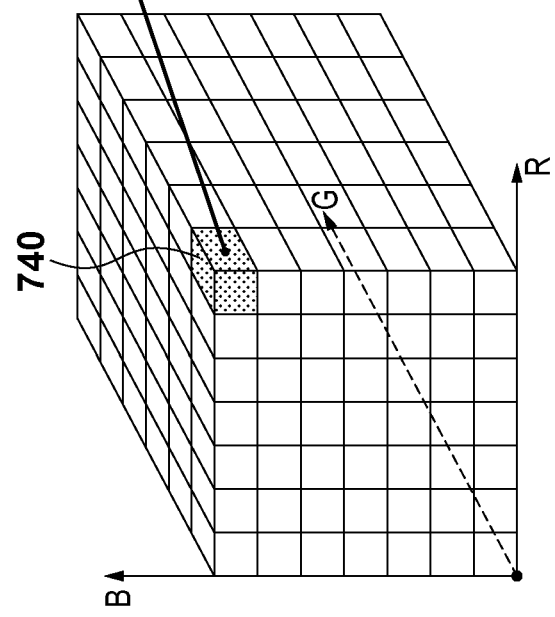
FIGS. 2A and 2B are views for explaining a tetrahedron interpolation using a 3DLUT.

A tetrahedron interpolation using a 3DLUT will be described below with reference to FIGS. 2A and 2B. A 3DLUT shown in FIG. 2A is configured by unit solids 740 obtained by dividing respective axes of a three-dimensional color space (RGB space) by a predetermined value, and color data (output signals) after color conversion at vertices of the unit solids 740 are stored as vertex data. That is, a unit solid 740 used in interpolation computations is selected using the upper bits $R_H G_H B_H$ of digital signals RGB as coordinates on the color space, and vertex data of the selected unit solid 740 are used in the interpolation computations.

Figure 2B:
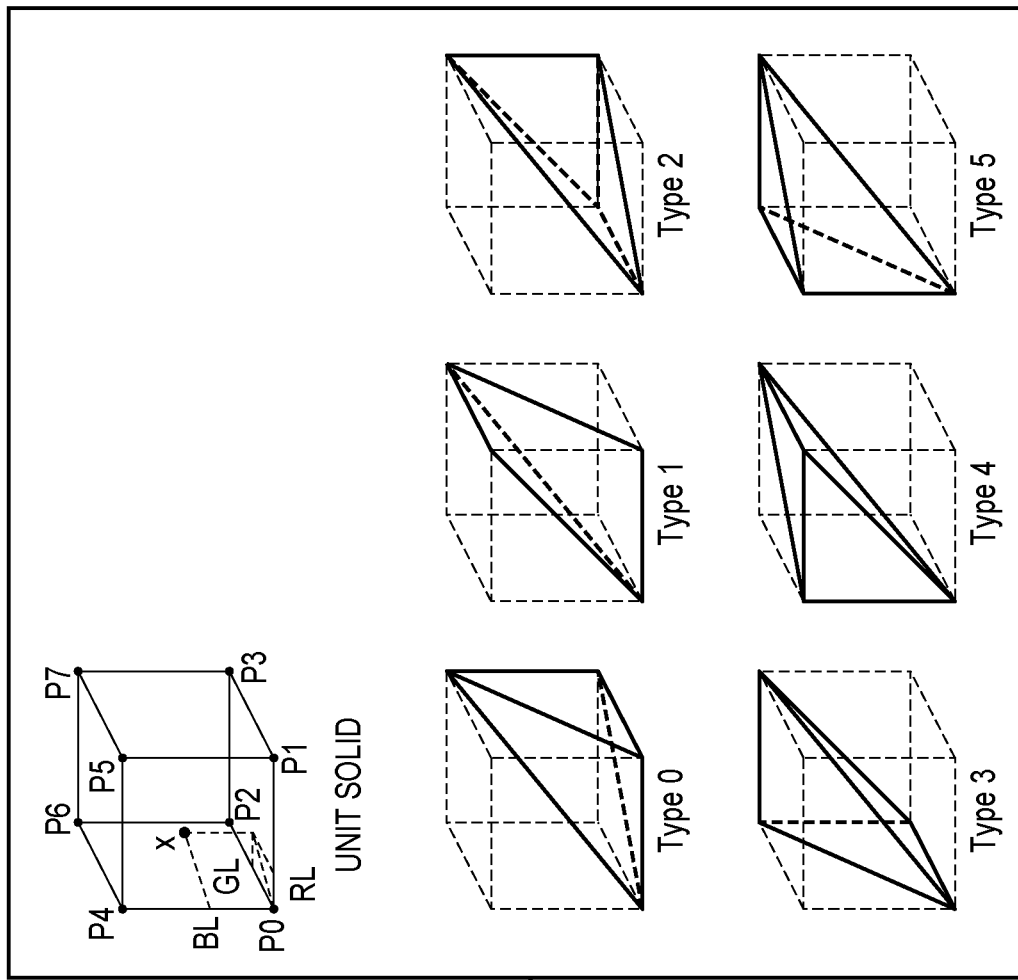

FIG. 2B shows tetrahedrons which can be extracted from the unit solid 740, and six tetrahedrons can be extracted. These six tetrahedrons will be respectively referred to as Type 0 to Type 5 hereinafter. When a unit solid at a vertex $P0(R_H, G_H, B_H)$ is selected, depending on a tetrahedron to which coordinates expressed by lower bits $R_L G_L B_L$ belong, interpolation computations are made using:

```
if (R_L > G_L > B_L) {
    Type 0;
    X = P0+ (P1−P0) ×R_L+ (P3−P0) ×G_L+ (P7−P0) ×B_L;
    ... (1)
}
if (R_L > B_L > G_L) {
    Type 1;
    X = P0+ (P1−P0) ×R_L+ (P7−P0) ×G_L+ (P5−P0) ×B_L;
    ... (2)
}
if (G_L > R_L > B_L) {
    Type 2;
    X = P0+ (P3−P0) ×R_L+ (P2−P0) ×G_L+ (P7−P0) ×B_L;
    ... (3)
}
if (G_L > B_L > R_L) {
    Type 3;
    X = P0+ (P7−P0) ×R_L+ (P2−P0) ×G_L+ (P6−P0) ×B_L;
    ... (4)
}
if (B_L > R_L > G_L) {
    Type 4;
    X = P0+ (P5−P0) ×R_L+ (P7−P0) ×G_L+ (P4−P0) ×B_L;
    ... (5)
}
if (B_L > G_L > R_L) {
    Type 5;
    X = P0+ (P7−P0) ×R_L+ (P6−P0) ×G_L+ (P4−P0) ×B_L;
    ... (6)
}
``` where P0 to P7 are vertex data of the unit solid shown in FIG. 2B.

[Multi-Dimensional Hypertetrahedron Interpolation Method]

A multi-dimensional hypertetrahedron interpolation which expands the three-dimensional tetrahedron interpolation to multi-dimensions will be described below.

When the three-dimensional space is expanded to an N-dimensional space, a unit solid shown in FIGS. 2A and 2B is multi-dimensionally expanded to a multi-dimensional unit hypersolid (N-dimensional hypersolid or hyperhexahedron), and a tetrahedron used in the three-dimensional tetrahedron interpolation is multi-dimensionally expanded to an (N+1)-hedron called a hypertetrahedron.

The hypertetrahedron is formed by line segments which couple a reference point and diagonal point of a unit hypersolid, and N edge lines which are orthogonal and coupled to each other of the hypersolid. Then, one unit hypersolid can be divided into N! hypertetrahedrons. N edge lines selected in a process for extracting the hypertetrahedrons from the unit hypersolid are perpendicular to each other, and are respectively parallel to respective axes of an N-dimensional orthogonal coordinate system. For this reason, a value obtained by adding a linear sum of output change amounts in respective axis directions to a reference point output value is an output of the multi-dimensional interpolation computations. Therefore, the interpolation computations can be attained by multiplying a difference value of vertex data at two end points of the selected edge line by a ratio of a distance from a reference point to a component value corresponding to each axis on each edge line, and adding the product to vertex data of the reference point.

An edge line selection method in a six-dimensional hypertetrahedron interpolation will be described below taking as an example a six-dimensional space (X0, X1, X2, X3, X4, X5) with reference to FIGS. 3A to 3G. FIG. 3A shows a coordinate system, and FIGS. 3B to 3G show the edge line selection method under the following conditions.

Conditions

Input coordinates: $(X0_i+\Delta X0, X1_j+\Delta X1, X2_k+\Delta X2, X3_l+\Delta X3, X4_m+\Delta X4, X5_n+\Delta X5)$ Reference coordinates: $(X0_i, X1_j, X2_k, X3_l, X4_m, X5_n)$ Differences between input coordinates and reference coordinates: $(\Delta X0, \Delta X1, \Delta X2, \Delta X3, \Delta X4, \Delta X5)$ Magnitude relationship among differences: $\Delta X0 > \Delta X1 > \Delta X2 > \Delta X3 > \Delta X4 > \Delta X5$ Initially, as shown in FIG. 3B, an edge line which is parallel to an X0 axis corresponding to the maximum difference $\Delta X0$ between the input and reference coordinates, and has the reference point as a start point, that is, an edge line which has the following start and end points is selected.

Start point: $(X0_i, X1_j, X2_k, X3_l, X4_m, X5_n)$
End point: $(X0_{i+1}, X1_j, X2_k, X3_l, X4_m, X5_n)$ Next, as shown in FIG. 3C, an edge line which is parallel to an X1 axis corresponding to the second largest difference $\Delta X1$ between the input and reference coordinates, and has the end point of the edge line shown in FIG. 3B as a start point, that is, an edge lines which has the following start and end points is selected.

Start point: $(X0_{i+1}, X1_j, X2_k, X3_l, X4_m, X5_n)$
End point: $(X0_{i+1}, X1_{j+1}, X2_k, X3_l, X4_m, X5_n)$ Likewise, as shown in FIG. 3D, an edge line which is parallel to an X2 axis corresponding to the third largest difference $\Delta X2$ between the input and reference coordinates, and has the following start and end points is selected.

Start point: $(X0_{i+1}, X1_{j+1}, X2_k, X3_l, X4_m, X5_n)$
End point: $(X0_{i+1}, X1_{j+1}, X2_{k+1}, X3_l, X4_m, X5_n)$ Likewise, as shown in FIG. 3E, an edge line which is parallel to an X3 axis corresponding to the fourth largest difference $\Delta X3$ between the input and reference coordinates, and has the following start and end points is selected.

Start point: $(X0_{i+1}, X1_{j+1}, X2_{k+1}, X3_l, X4_m, X5_n)$
End point: $(X0_{i+1}, X1_{j+1}, X2_{k+1}, X3_{l+1}, X4_m, X5_n)$ Likewise, as shown in FIG. 3F, an edge line which is parallel to an X4 axis corresponding to the fifth largest difference $\Delta X4$ between the input and reference coordinates, and has the following start and end points is selected.

Start point: $(X0_{i+1}, X1_{j+1}, X2_{k+1}, X3_{l+1}, X4_m, X5_n)$
End point: $(X0_{i+1}, X1_{j+1}, X2_{k+1}, X3_{l+1}, X4_{m+1}, X5_n)$ Lastly, as shown in FIG. 3G, an edge line which is parallel to an X5 axis corresponding to the minimum difference $\Delta X5$ between the input and reference coordinates, and has the following start and end points is selected.

Start point: $(X0_{i+1}, X1_{j+1}, X2_{k+1}, X3_{l+1}, X4_{m+1}, X5_n)$
End point: $(X0_{i+1}, X1_{j+1}, X2_{k+1}, X3_{l+1}, X4_{m+1}, X5_{n+1})$ Finally, the following seven vertices are selected, and a hypertetrahedron (heptahedron) is decided.

Reference point $(X0_i, X1_j, X2_k, X3_l, X4_m, X5_n)$
$(X0_{i+1}, X1_j, X2_k, X3_l, X4_m, X5_n)$
$(X0_{i+1}, X1_{j+1}, X2_k, X3_l, X4_m, X5_n)$
$(X0_{i+1}, X1_{j+1}, X2_{k+1}, X3_l, X4_m, X5_n)$
$(X0_{i+1}, X1_{j+1}, X2_{k+1}, X3_{l+1}, X4_m, X5_n)$
$(X0_{i+1}, X1_{j+1}, X2_{k+1}, X3_{l+1}, X4_{m+1}, X5_n)$
Diagonal point $(X0_{i+1}, X1_{j+1}, X2_{k+1}, X3_{l+1}, X4_{m+1}, X5_{n+1})$ At this time, a point farthest from the reference point will be referred to as a diagonal point, and a line segment which couples the reference point and diagonal point will be referred to as a diagonal axis.

The multi-dimensional hypertetrahedron interpolation is characterized in that the reference point and diagonal point are always selected as vertices of a hypertetrahedron irrespective of the magnitude relationship among the differences ($\Delta X0, \Delta X1, \Delta X2, \Delta X3, \Delta X4, \Delta X5$) between the input coordinates and reference point coordinates. Hence, the process for selecting a hypertetrahedron corresponding to input coordinates from a unit hypersolid can be considered as a routing problem which selects a route from the reference point to the diagonal point if the reference point is considered as a start, the diagonal point is considered as a goal, and respective edge lines are considered as a route from the start to the goal.

In this case, the "number of cases" that the route can assume is 6!=720, and in the six-dimensional interpolation computations, a unit hypersolid can be divided into 720 hypertetrahedrons. Likewise, in case of N-dimensional interpolation computations, a unit hypersolid can be divided into N! hypertetrahedrons.

The N-dimensional interpolation computations will be described below. Let $P\langle i, j, \ldots, a, b\rangle$ be vertex data at coordinates $(X0_i, X1_j, \ldots, Xn-2_a, Xn-1_b)$ on a space (X0, X1, ..., Xn-2, Xn-1) fixed to N-dimensional orthogonal coordinates. Also, let $(X0_i, X1_j, \ldots, Xn-2_a, Xn-1_b)$ be coordinates of a reference point of a hypersolid selected based on certain input coordinates, and $(\Delta X0, \Delta X1, \ldots, \Delta Xn-2, \Delta Xn-1)$ be differences between the input coordinates and reference point coordinates. Then, when a relationship $\Delta X0 > \Delta X1 \gg \ldots > \Delta Xn-2 > \Delta Xn-1$ holds, an interpolated value X can be calculated using:

$$X = P\langle i, j, \ldots, a, b\rangle + \qquad (7)$$
$$(P\langle i+1, j, \ldots, a, b\rangle - P\langle i, j, \ldots, a, b\rangle) \times \Delta X0 +$$
$$(P\langle i+1, j+1, \ldots, a, b\rangle - P\langle i+1, j, \ldots, a, b\rangle) \times \Delta X1 + \ldots +$$
$$(P\langle i+1, j+1, \ldots, a+1, b\rangle - P\langle i+1, j+1, \ldots, a, b\rangle) \times \Delta Xn-2 + (P\langle i+1, j+1, \ldots, a+1, b+1\rangle -$$
$$P\langle i+1, j+1, \ldots, a+1, b\rangle) \times \Delta Xn-1$$

[Arrangement of Apparatus]

Figure 4:
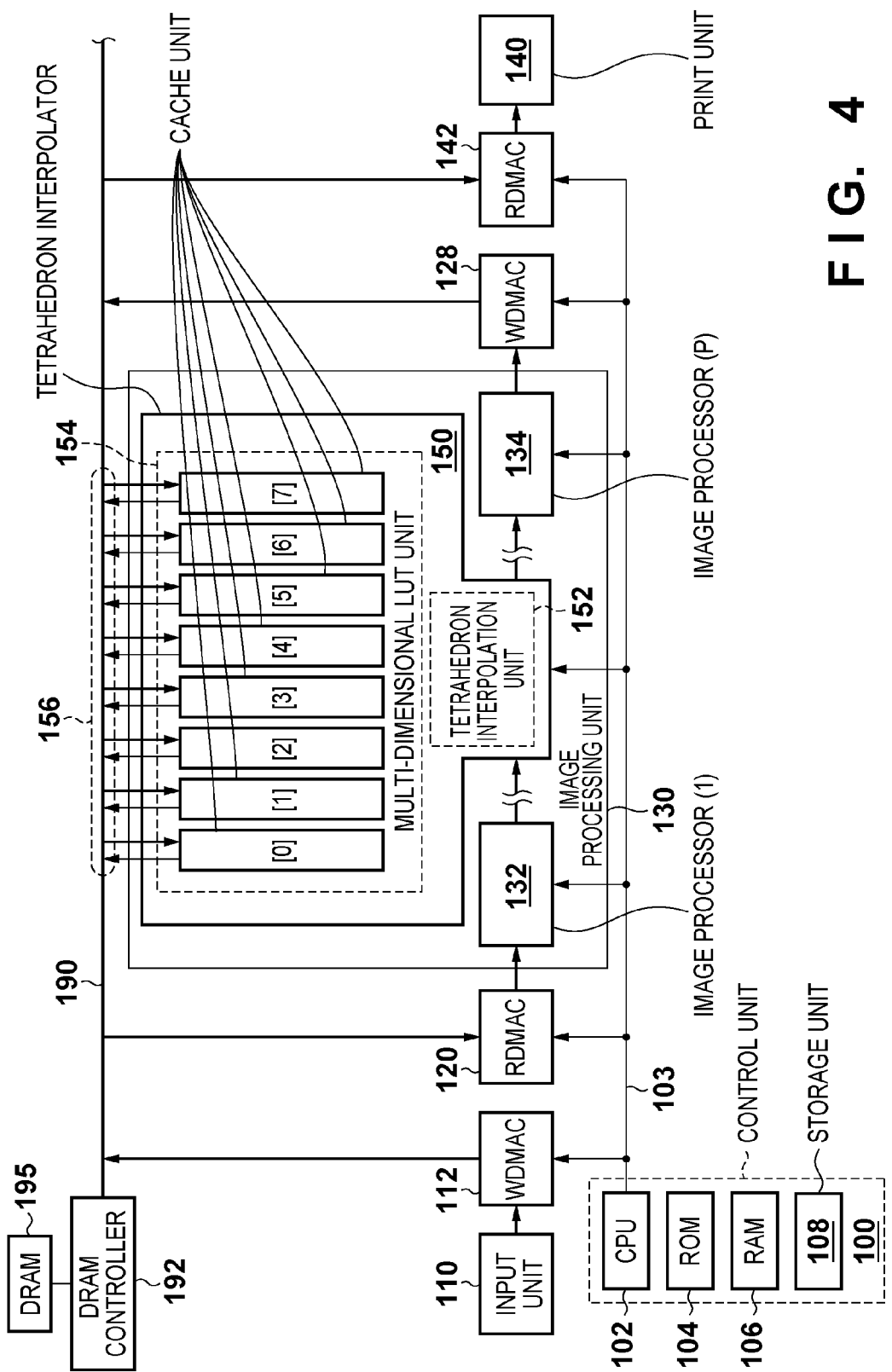
FIG. 4 is a block diagram for explaining the arrangement of an image processing apparatus according to an embodiment.

The arrangement of an image processing apparatus of this embodiment will be described below with reference to the block diagram shown in FIG. 4.

A control unit 100 includes, in addition to a microprocessor (CPU) 102, a read-only memory (ROM) 104 which stores permanent data and programs, a random access memory (RAM) 106 used by the CPU 102 as a work memory, and a storage unit 108 such as a hard disk drive. The CPU 102 executes programs stored in the ROM 104 and storage unit 108 and controls respective components to be described below via a control bus 103. The storage unit 108 is a storage medium such as a hard disk drive which stores, for example, parameters, programs, and correction data used by the color processing apparatus.

An input unit 110 is a light-receiving unit of a digital camera or scanner, which has a lens, image sensor, analog-to-digital converter, and the like (not shown). The input unit 110 converts image information formed on the image sensor via the lens into RGB analog electric signals, applies correction to RGB colors, respectively, and analog-to-digital converts the analog electric signals, thus outputting RGB digital image signals. Note that a set of digital image signals expresses one pixel of an image.

The CPU 102 of the control unit 100 controls a WDMAC 112 as a direct memory access controller (DMAC) for write accesses to store image data output from the input unit 110 in a dynamic RAM (DRAM) 195 via a system bus 190 and DRAM controller 192. Note that image data which has already been stored in the DRAM 195 may undergo computing processing pixel by pixel to be converted into another data such as the aforementioned principal component vectors and principal component coefficients, and the converted data may be stored as image data in the DRAM 195 again.

The CPU 102 then controls an RDMAC 120 for read accesses to read out image data stored in the DRAM 195, and inputs the readout image data to an image processing unit 130. The image processing unit 130 applies various kinds of image processing to the input image data using image processors such as an image processor (1) 132 and image processor (P) 134. A tetrahedron interpolator 150 is also one of these plurality of image processors. Then, the CPU 102 controls a WDMAC 128 to store image data which has undergone the image processing by the plurality of image processors in the DRAM 195 again.

The CPU 102 then controls an RDMAC 142 to read out image data which is stored in the DRAM 195 and has undergone the image processing, and outputs the readout image data to a print unit 140. The print unit 140 includes a print output unit such as a raster plotter using, for example, an ink-jet head or thermal head, and prints an image based on the input image data on a print sheet.

Note that the WDMACs 112 and 128 are DMACs for write accesses, and the RDMACs 120 and 142 are those for read accesses. The input unit 110 and print unit 140 may be externally connected to the color processing apparatus. In this case, the color processing apparatus and the input unit 110 and print unit 140 communicate with each other via a serial bus interface such as USB (Universal Serial Bus) or IEEE1394, thus exchanging image data.

The tetrahedron interpolator 150 is roughly configured by a tetrahedron interpolation unit 152 which executes computing processing, and a multi-dimensional LUT unit 154. The multi-dimensional LUT unit 154 includes eight cache units [0] to [7], and is connected to the DRAM controller 192 and DRAM 195 via contacts 156 with the system bus 190. The cache units [0] to [7] directly read out data from the DRAM 195, and set/update vertex data of a multi-dimensional LUT.

Tetrahedron Interpolation Unit

The arrangement of the tetrahedron interpolation unit 152 will be described below with reference to the block diagram shown in FIG. 5.

The tetrahedron interpolation unit 152 inputs image data data_in[0] to data_in[5] having six components. A data division unit 210 divides the image data into upper bit signals intg[0] to intg[5] and lower bit signals frac[0] to frac[5]. In general, bit depths of the upper bit signals intg[0] to intg[5] are decided according to the number of unit hypersolids used in interpolation computations. For example, when there are (2gr-1) unit hypersolids for a certain axis of the six-dimensional space, the bit depths of the upper bit signals intg[0] to intg[5] corresponding to that axis are gr bits. Also, the lower bit signals frac[0] to frac[5] are expressed by remaining bit depths obtained by subtracting the bit depths of the upper bit signals intg[0] to intg[5] from those of the image data data_in[0] to data_in[5].

An order determination unit 230 determines the magnitude relationship of the input lower bit signals frac[0] to frac[5], and outputs order signals order[0] to order[5] indicating the determination results. The order signals order[0] to order[5] indicate 6! different edge line selection patterns which are determined in advance according to the sequence for selecting edge lines of a hypertetrahedron (heptahedron) used in the interpolation computations from a unit hypersolid.

A reference coordinate selection unit 220 decides coordinates used to read out seven vertex data required for the interpolation computations from the multi-dimensional LUT unit 154 according to the order signals order[0] to order[5], and outputs the decided coordinate values as seven reference coordinate signals coord[0] to coord[6].

A weighing coefficient calculation unit 240 outputs seven weighting coefficient signals weight[0] to weight[6] for the interpolation computations in accordance with the lower bit signals frac[0] to frac[5]. Note that as the weighting coefficient signals weight[0] to weight[6], signals corresponding to the lower bit signals frac[0] to frac[5] may be read out from, for example, a correspondence table (table) stored in advance in the ROM 104. The weighting coefficient signals weight[0] to weight[6] may be calculated from the lower bit signals frac[0] to frac[5] using predetermined calculation formulas.

A vertex data read-out unit 250 controls the multi-dimensional LUT unit 154 based on the reference coordinate signals coord[0] to coord[6] to read out seven vertex data from the multi-dimensional LUT unit 154. Then, the unit 250 outputs the readout vertex data as vertex data signals lut_val[0] to lut_val[6].

The vertex data read-out unit 250 transmits eight read address signals read-addr[0] to read-addr[7] to the multi-dimensional LUT unit 154, and receives eight data read signals read_data[0] to read_data[7] from the multi-dimensional LUT unit 154. Of these read address signals read-addr[0] to read-addr[7] and data read signals read_data[0] to read_data[7], a maximum of seven pairs of signals are vertex data required for the six-dimensional hypertetrahedron interpolation. That is, at least one pair of signals are unnecessary, and the vertex data read-out unit 250 may discard the unnecessary vertex data after it receives the data read signals read_data[0] to read_data[7]. Alternatively, the vertex data read-out unit 250 may set a 1-bit flag indicating validity/invalidity for each of the read address signals read-addr[0] to read-addr[7] to validate necessary ones of the read address signals read-addr[0] to read-addr[7] and to invalidate the remaining one, thus skipping a read access of unnecessary vertex data. For example, when one of the differences ($\Delta X0$, $\Delta X1$, ..., $\Delta Xn-2$, $\Delta Xn-1$) between the input coordinates and reference point coordinates is "0", since vertex data corresponding to the difference "0" does not influence the interpolation result X, that vertex data need not be read out.

An interpolation computing unit 270 inputs the vertex data signals lut_val[0] to lut_val[6] and weighting coefficient signals weight[0] to weight[6], and makes interpolation computations using equation (7), thus outputting output signals data_out[0] to data_out[5]. Note that when the parentheses of equation (1) may be expanded, and computations for respective vertex data P are put into parentheses, seven coefficients are used for these computations, and correspond to the weighting coefficient signals weight[0] to weight[6].

When one (for example, lut_val[0]) of vertex data is configured by vertex data of a plurality of components (a plurality of colors), as will be described later, the interpolation computation results as many as the number of components (the number of colors) are generated. That is, output signals data_out as many as the number of components (the number of colors) are output. Note that the arrangement shown in FIG. 5 corresponds to a case in which vertex data is configured by six components (six colors), and image data for six components are output. However, the number of components (the number of colors) is not limited to "6". That is, the present invention is applicable to image data having any number of components such as four colors, eight colors, and 12 colors as long as the number of colors is equal to or larger than three.

Multi-Dimensional LUT Unit

Figure 6:
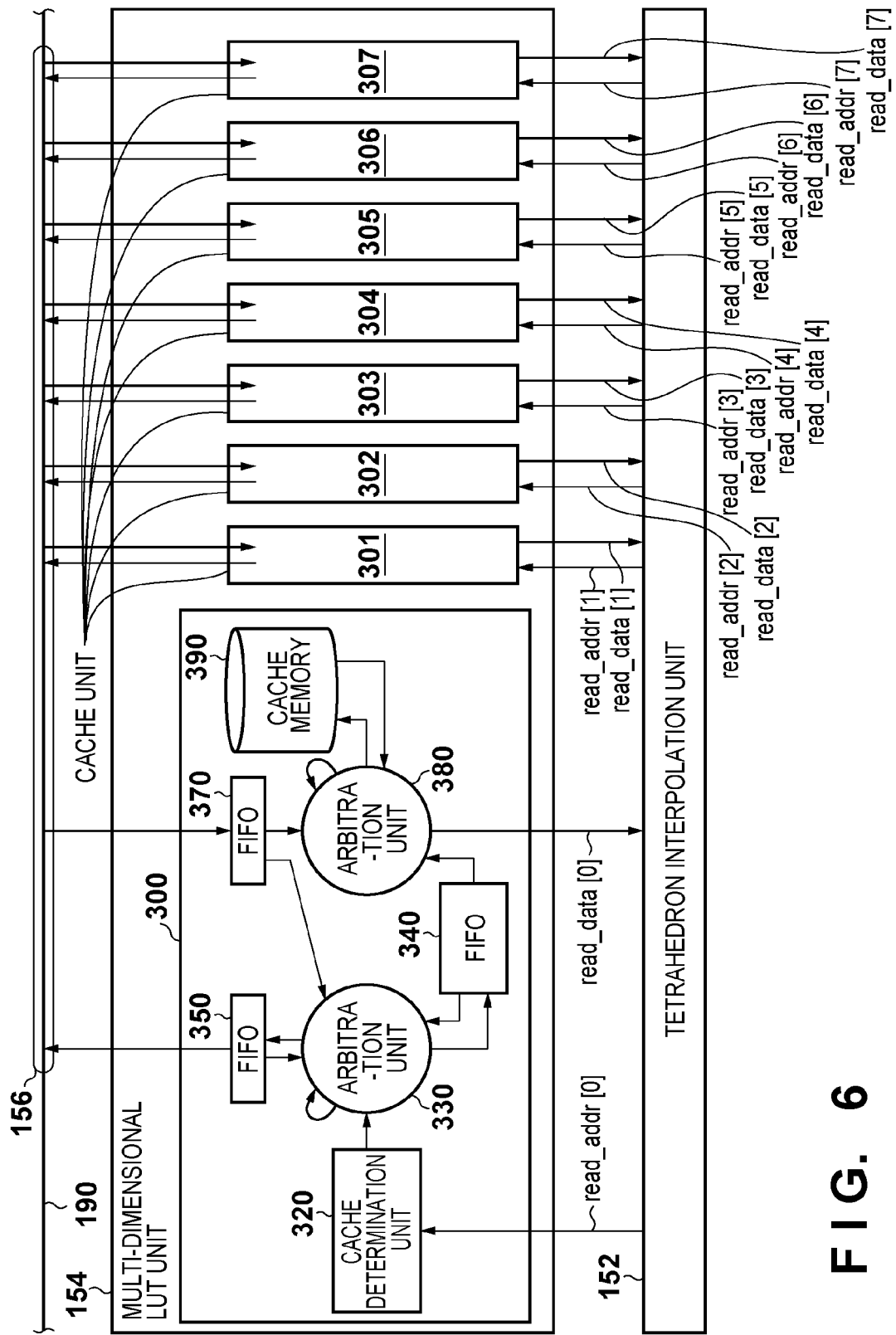
FIG. 6 is a block diagram for explaining the arrangement of a multi-dimensional LUT unit.

The arrangement of the multi-dimensional LUT unit 154 will be described below with reference to the block diagram shown in FIG. 6.

The multi-dimensional LUT unit 154 is configured by eight cache units 300 to 307. Since the cache units 300 to 307 have the same arrangement, the detailed arrangement of the cache unit 300 will be explained, and a description of other cache units will not be given. One multi-dimensional LUT is normally used in a tetrahedron interpolation. However, since vertex data required for an interpolation are required to be parallelly read out from an LUT, vertex data of the multi-dimensional LUT are divisionally stored in a plurality of memories. At this time, the plurality of memories are called "sub memories", and one "sub memory" corresponds to one cache unit. Of course, each sub memory can be implemented by a memory element such as a static RAM (SRAM) in place of the cache. A method of divisionally storing vertex data which configure the multi-dimensional LUT in the plurality of sub memories will be described later. For example, in one configuration, vertex data of the multi-dimensional LUT are equally divisionally stored in the sub memories, so as to reduce the number of sub memories as much as possible.

When the tetrahedron interpolation unit 152 reads out data from the DRAM 195 via the cache units 300 to 307, it inputs data storage destinations on the DRAM 195 as the read address signals read-addr[0] to read-addr[7] to cache determination units 320. Each read address signal is configured by:

a flag,
an address signal,
an index signal, and
a transfer amount signal.

As described above, when the flag indicates invalidity, the corresponding read address signal can be discarded. The index signal indicates a storage position of vertex data, as will be described in detail later. Each cache determination unit 320 determines a cache hit or cache miss based on the address signal, and outputs a read address signal added with the following determination results to an arbitration unit 330:

a tag ID signal as a storage destination of cache data, and
a cache-miss flag signal as a cache determination result.

When the cache-miss flag indicates a cache miss, the arbitration unit 330 outputs a refill address signal onto the system bus 190 via a transmission first-in first-out buffer (FIFO) 350. A refill address signal 352 is configured by an "address signal" and "transfer amount signal". Then, the arbitration unit 330 writes an "index signal", "tag ID signal", and "cache-miss flag signal" in a queuing FIFO 340. Also, the arbitration unit 330 does not output any refill address signal 352 when the cache-miss flag signal indicates a hit.

When the cache-miss flag signal indicates a cache miss, cache data according to the transfer amount signal is read out from the DRAM 195 according to the refill address signal, and is stored in a reception FIFO 370 as a refill data signal.

An arbitration unit 380 evaluates whether or not data are stored in storage areas of the reception FIFO 370 and queuing FIFO 340, and reads out data to be processed from the queuing FIFO 340 when the queuing FIFO 340 stores data.

When a cache-miss flag signal of the readout data indicates a cache miss, the arbitration unit 380 reads out a refill data signal from the reception FIFO 370. Then, the arbitration unit 380 writes data indicated by a transfer amount signal of the readout data at a storage destination of a cache memory 390 indicated by a tag ID signal of the readout data. Note that when the reception FIFO 370 is empty, the arbitration unit 380 waits. Then, the arbitration unit 380 extracts only vertex data indicated by an index signal of the refill data signal, and outputs the vertex data as the data read signals read_data[0] to read_data[7] to the tetrahedron interpolation unit 152.

Also, when the cache-miss flag signal of the readout data indicates a hit, the arbitration unit 380 determines that vertex data has already been stored in the cache memory 390. Hence, the arbitration unit 380 extracts only vertex data indicated by the index signal of the readout data of cache data located at the storage destination indicated by the tag ID signal of the readout data from the cache memory 390. Then, the arbitration unit 380 outputs that vertex data as the data read signals read_data[0] to read_data[7] to the tetrahedron interpolation unit 152.

Vertex Data Divisional Storage Method

A method of equally dividing vertex data of the multi-dimensional LUT into eight and storing the divided data without any overlaps will be described below with reference to FIG. 7.

As described above, FIGS. 3A to 3G show the selection example of edge lines and vertices of the six-dimensional hypertetrahedron, and select respective vertices of a unit hypersolid from the reference point to the diagonal point in descending order of difference ($\Delta X0$, $\Delta X1$, ..., $\Delta Xn-2$, $\Delta Xn-1$) from the reference point coordinates. FIG. 7 shows classification results of vertices of $2^6$ points which configure a unit hypersolid based on distances (to be referred to as six-dimensional Manhattan distances hereinafter) Dm of routes from the reference point to the respective selected vertices.

The six-dimensional Manhattan distance Dm is an integer ranging from 0 to 6, and vertex data located at Dm=0 includes only one pattern of the reference point. In turn, vertex data at Dm=1 includes six patterns, vertex data at Dm=2 includes 15 patterns, vertex data at Dm=3 includes 20 patterns, vertex data at Dm=4 includes 15 patterns, and vertex data at Dm=5 includes six patterns. Finally, vertex data at Dm=6 includes only one pattern of the diagonal point. By combining all the patterns, $2^6$ patterns are obtained, as a matter of course. The number of patterns matches the total number of vertices of the unit hypersolid.

Figure 7:
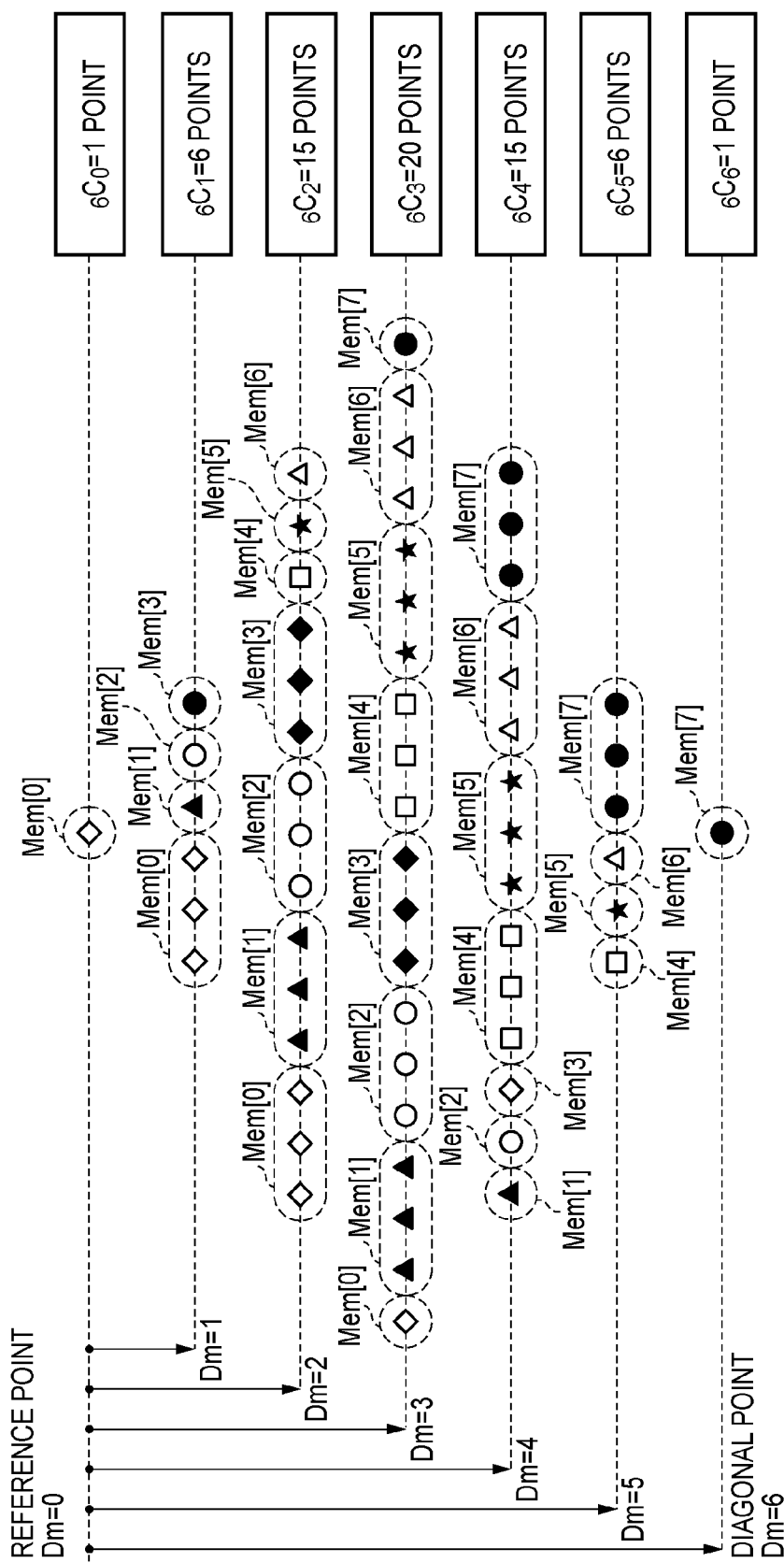
FIG. 7 is a view for explaining a method of equally dividing vertex data of a multi-dimensional LUT into eight, and storing the divided data without any overlaps.

In this embodiment, eight groups of vertex data sets Mem[0] to Mem[7] shown in FIG. 7 are formed. The vertex data sets Mem[0] to Mem[7] are respectively configured by eight-vertex unit vertex data. Then, eight-vertex unit vertex data of every vertex data set is distributed within a zone up to the Manhattan distance=4. For example, the vertex data sets Mem[0] fall within a zone of Dm=0 to 3, and the vertex data sets Mem[1] fall within a zone of Dm=1 to 4.

Since the sequence for selecting hypertetrahedrons used in the interpolation computations from a unit hypersolid is considered as the routing problem about routes from the reference point to the diagonal point via vertices, one vertex data is always selected from the vertex data groups having the same Manhattan distance Dm. The respective vertex data sets always exhibit a distribution "one→three→three→one" within the zone up to the Manhattan distance=4. Hence, a maximum of four vertex data are simultaneously referred to from one cache unit, and can be specified irrespective of combinations of vertex data. Therefore, one entry (cache line) of the cache memory 390 of the cache unit stores eight vertex data of each vertex data group. Then, a maximum of four vertex data are selected in accordance with an index signal, and can be output as one of the data read signals read_data[0] to read_data[7].

That is, when the eight-division method is used like in this embodiment, each cache unit of the multi-dimensional LUT need only be configured to always extract zero to four vertex data from eight vertex data selected by the tag ID signal in accordance with the index signal. By limiting required hardware resources in this way, the six-dimensional hypertetrahedron interpolation can be implemented by hardware.

Format of Vertex Data

The format of vertex data required to implement hardware which performs the six-dimensional hypertetrahedron interpolation by the eight-division method of this embodiment will be described below with reference to FIGS. 8A to 8C.

Figure 8B:
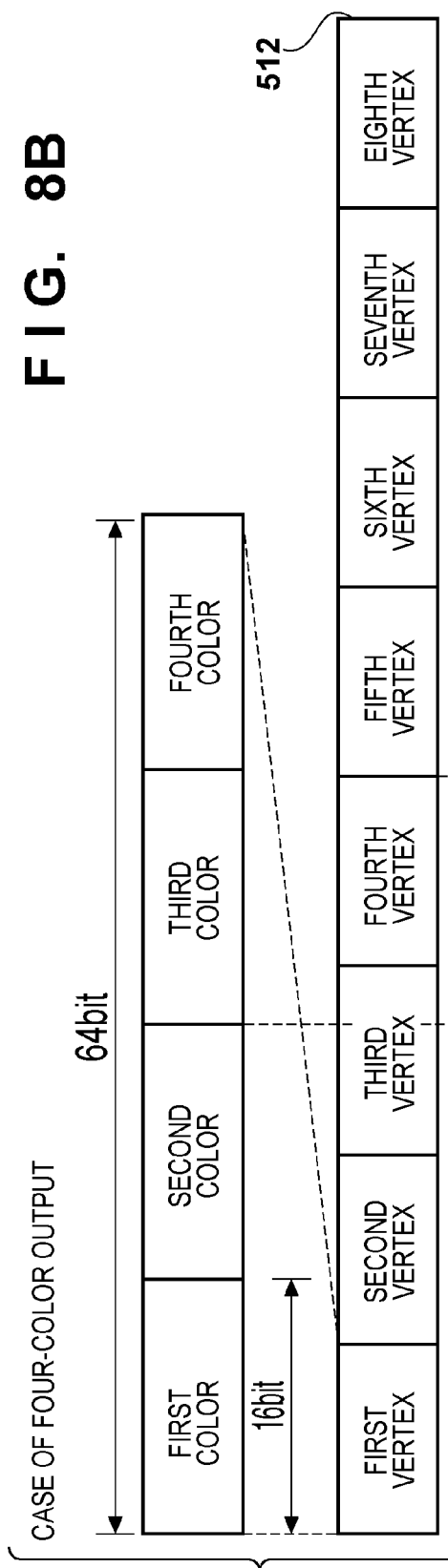
Figure 8C:
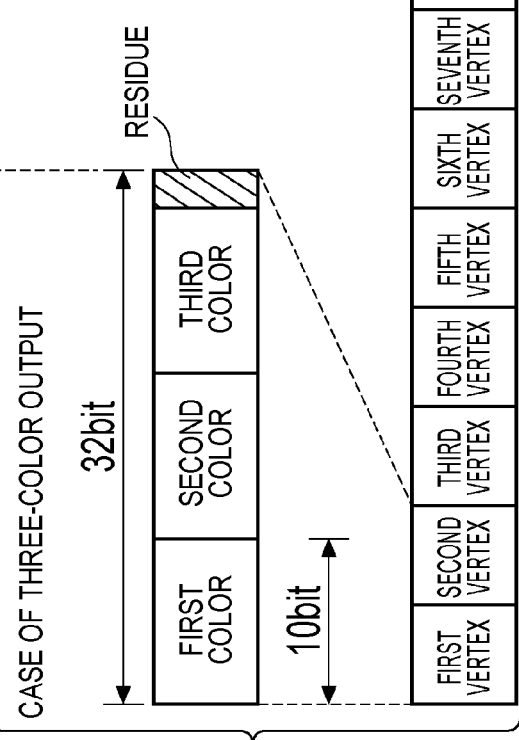

FIG. 8A shows a format including data of six components (six colors) per vertex data. When each component is 10-bit data, one vertex data has a 64-bit length including residual bits. Then, data for eight vertices form one set of refill data. When the refill data is transferred via the system bus 190, it is divided and transferred according to the bus width of the system bus 190. For example, when the bus width is 64 bits, the refill data signal is divided into 64 bits×8. When refill data signals are stored in the cache memory 390, they are coupled to have a 512-bit length as one entry length. Note that FIG. 8A is an example, and eight vertex data need only form one set of refill data. However, the number of components (the number of colors) and the bit length of one vertex data can be arbitrarily set. For example, FIG. 8B shows an example in which one vertex data includes four components (four colors), and has a 64-bit length. FIG. 8C shows an example in which one vertex data includes three components (three colors), and has a 32-bit length.

Generation of Read Address Signal

A read address signal generation method will be described below with reference to FIGS. 9A to 9C.

The vertex data read-out unit 250 generates the read address signals read-addr[0] to read-addr[7] based on the reference coordinate signals coord[0] to coord[6] output from the reference coordinate selection unit 220. The reference coordinate signals coord[0] to coord[6] respectively indicate coordinates of vertex data to be referred to on the multi-dimensional LUT. That is, each of the reference coordinate signals coord[0] to coord[6] is a six-dimensional coordinate signal (coord_x0, coord_x1, coord_x2, coord_x3, coord_x4, coord_x5).

Figure 9A:
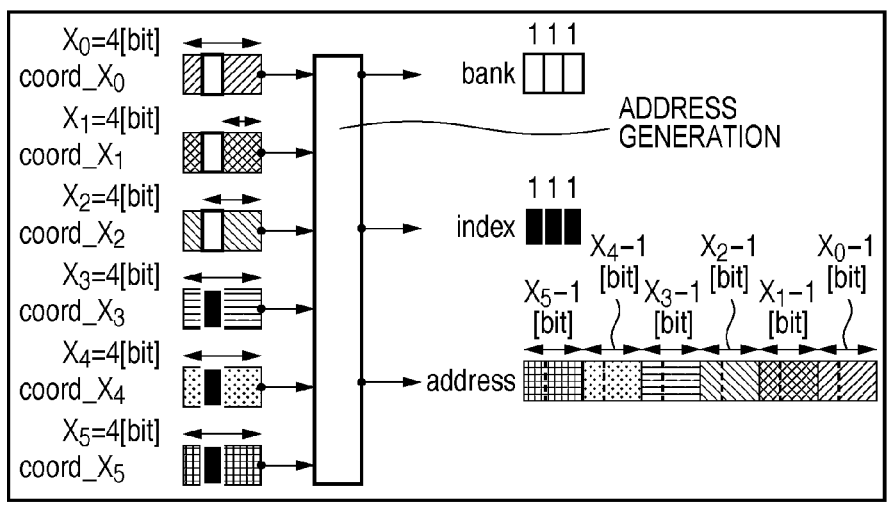
FIGS. 9A to 9C are views for explaining a read address signal generation method.

FIG. 9A shows an example in which the multi-dimensional LUT has vertex data of 16 points per axis, and respective components coord_x0 to coord_x5 of the six-dimensional coordinate signal have a 4-bit length. Note that the total number of vertex data of the multi-dimensional LUT amounts to $16^6$. The vertex data read-out unit 250 generates a read address signal configured by an address signal "address", a bank signal "bank" indicating a number of the cache unit, and an index signal "index" indicating a number of vertex data of one entry of cache data.

Figure 10:
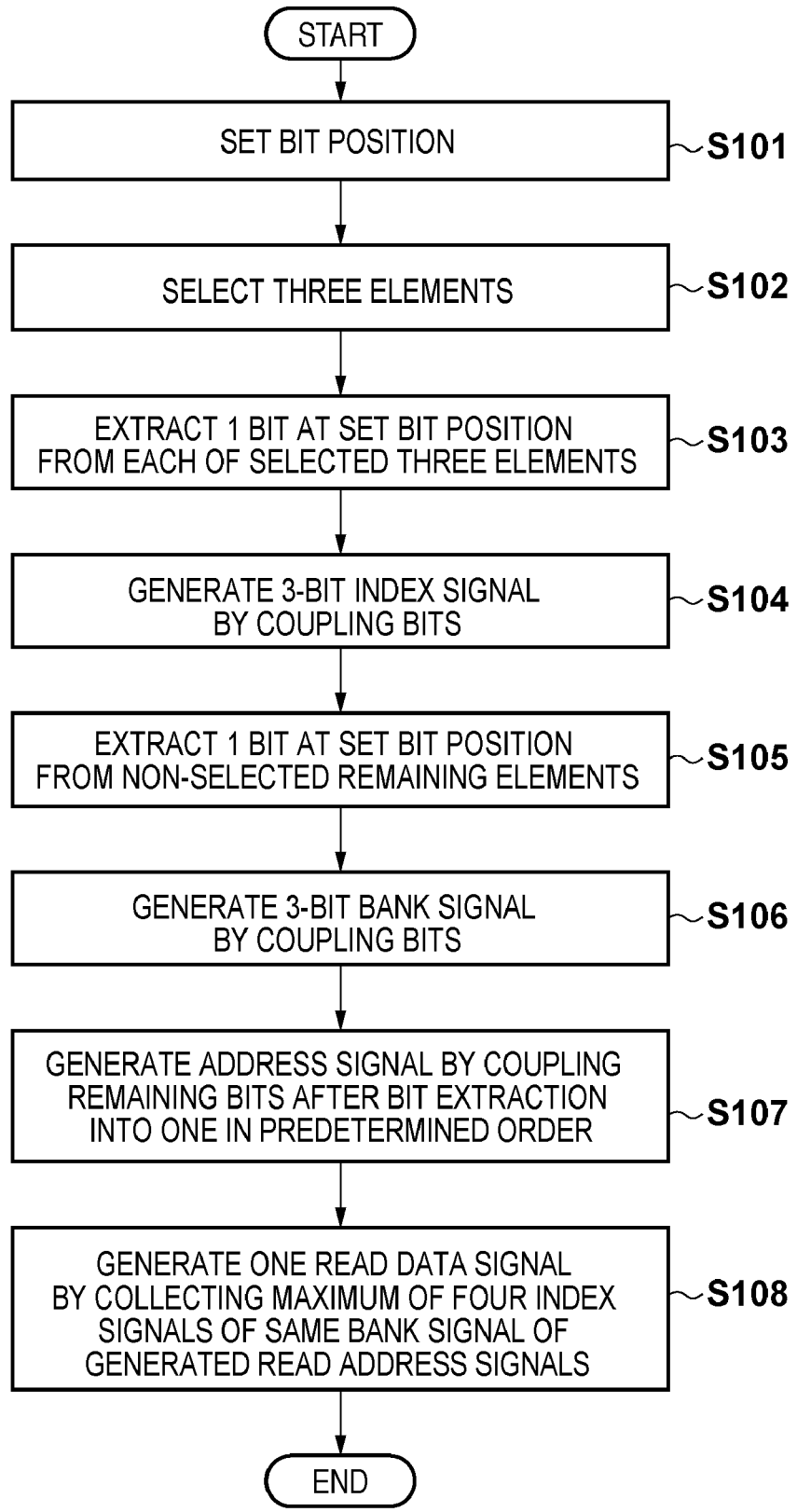
FIG. 10 is a flowchart for explaining the sequence for generating read address signals by a vertex data read-out unit.

The generation sequence of read address signals by the vertex data read-out unit 250 will be described below with reference to the flowchart shown in FIG. 10.

The vertex data read-out unit 250 arbitrary sets a bit position for respective components of a six-dimensional coordinate signal (set bit position, S101). Subsequently, the vertex data read-out unit 250 arbitrarily selects three components from the components of the six-dimensional coordinate signal (select component, S102). Then, the vertex data read-out unit 250 extracts 1 bit at the set bit position from each of the selected three components (extract bit, S103), and couples these bits to generate a 3-bit index signal (generate index signal, S104).

Next, the vertex data read-out unit 250 extracts 1 bit at the set bit position from each of components other than the three components selected in step S102 of the components of the six-dimensional coordinate signal (extract bit, S105). Then, the vertex data read-out unit 250 couples these bits to generate a 3-bit bank signal (generate bank signal, S106).

Then, the vertex data read-out unit 250 generates an address signal by coupling the remaining bits after bit extraction from the components of the six-dimensional coordinate signal into one in a predetermined order (generate address signal, S107).

With this sequence, seven sets of read address signals (each including an index signal, bank signal, and address signal) corresponding to the reference coordinate signals coord[0] to coord[6] are obtained. As has been described above in the vertex data divisional storage method, a maximum of four vertex data can exist for one read data signal. Hence, the vertex data read-out unit 250 collects a maximum of four index signals of the same bank signals (also address signals) of the seven sets of generated read address signals to generate one read data signal (S108). Then, the vertex data read-out unit 250 outputs the address signal and this index signal as the data read signals read_data[0] to read_data[7] to the cache unit corresponding to the bank signal.

Figure 9B:
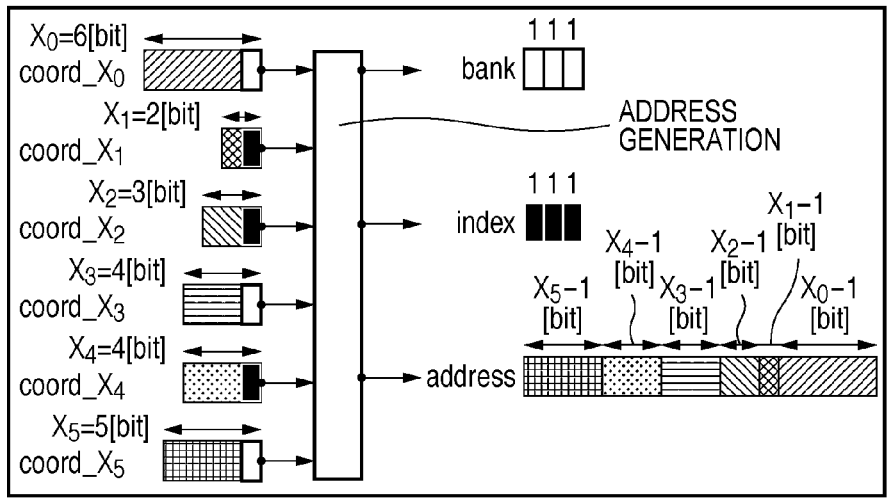

FIG. 9B shows a case in which respective axes of the multi-dimensional LUT have vertex data of 64, 4, 8, 16, 16, and 32 points. In this case, respective components of the six-dimensional coordinate signal respectively have 6-bit, 2-bit, 3-bit, 16-bit, 16-bit, and 5-bit lengths. Note that the total number of vertex data of the multi-dimensional LUT amounts to 64×4×8×16×16×32 points. Even in such case, the generation sequence of read address signals (each including an address signal, bank signal, and index signal) is the same as that in the case in which the multi-dimensional LUT has vertex data of 16 points per axis.

As described above, in the six-dimensional hypertetrahedron interpolation, the six-dimensional LUT can be equally divisionally stored in eight caches without any overlaps, and seven vertex data required for the interpolation computations can be obtained by hardware resources of a relatively small circuit scale. As a result, the interpolation computations can be executed at high speed by hardware resources of a relatively small circuit scale.

[Low-dimensional Tetrahedron Interpolation]

The following description will demonstrate that it is possible to implement low-dimensional tetrahedron interpolations such as three- and four-dimensional interpolations using the aforementioned arrangement.

Tetrahedron Interpolation Unit

As described above, the three-dimensional tetrahedron interpolation can be expanded to multi-dimensions. Conversely, the apparatus for the six-dimensional hypertetrahedron interpolation can be degenerated to a low-dimensional interpolation apparatus. For example, in order to attain degeneration to a four-dimensional interpolation apparatus, in the arrangement shown in FIG. 5, input signals data_in[0] to data_in[3] are used, and signals data_in[4] and data_in[5] are always set to be "0". Also, signals intg[4] and intg[5], frac[4] and frac[5], order[4] and order[5], weight[5] and weight[6], and coord[5] and coord[6] are set to be "0" as those which are not used.

Figure 5:
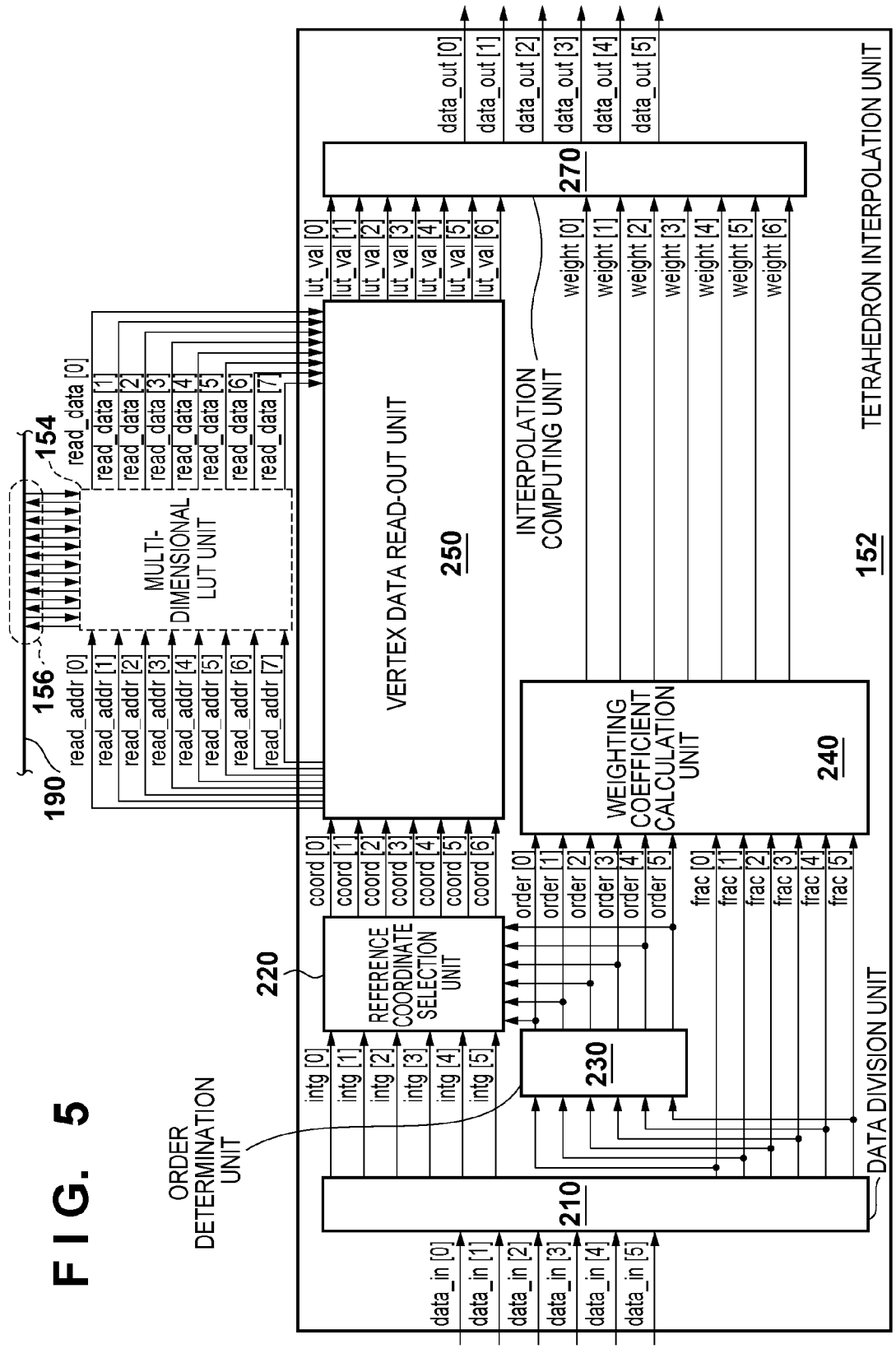
FIG. 5 is a block diagram for explaining the arrangement of a tetrahedron interpolation unit.

Likewise, in order to attain degeneration to a three-dimensional interpolation apparatus, in the arrangement shown in FIG. 5, input signals data_in[0] to data_in[2] are used, and signals data_in[3] to data_in[5] are always set to be "0". Also, signals intg[3] to intg[5], frac[3] to frac[5], order[3] to order [5], weight[4] to weight[6], and coord[4] to coord[6] are set to be "0" as those which are not used.

Multi-Dimensional LUT Unit

As described above, the multi-dimensional LUT unit 154 is configured by the eight cache units. To attain generation to low-dimensions, some of these cache units are used, and the remaining cache units are not used. In order to implement a four-dimensional hypertetrahedron interpolation by a vertex data divisional storage method (to be described later), arbitrary two out of the eight cache units are used, and the remaining units are not used. In order to implement a three-dimensional tetrahedron interpolation, arbitrary one out of the eight cache units is used, and the remaining units are not used. In this way, by changing the number of cache units to be used, a low-dimensional interpolation apparatus can be easily implemented. Of course, the consumption power of the overall apparatus can be reduced by enabling minimum required cache units and disabling the remaining cache units.

Vertex Data Divisional Storage Method

Figure 11A:
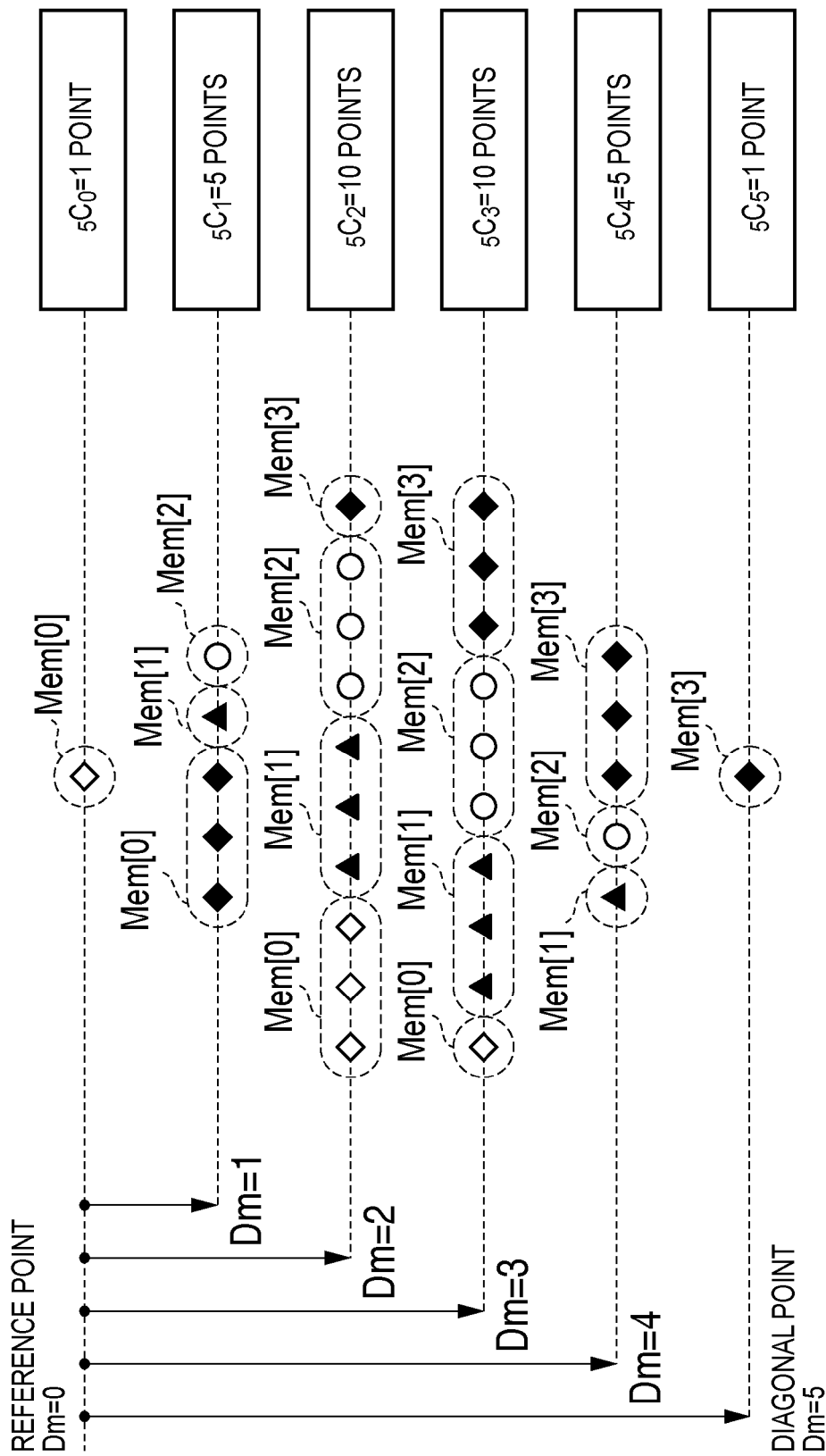
FIGS. 11A to 11C are views for explaining a method of equally divisionally storing vertex data of a multi-dimensional LUT without any overlaps in a low-dimensional tetrahedron interpolation.

A method of equally divisionally storing vertex data of the multi-dimensional LUT without any overlaps will be described below with reference to FIGS. 11B and 11C.

Figure 11B:
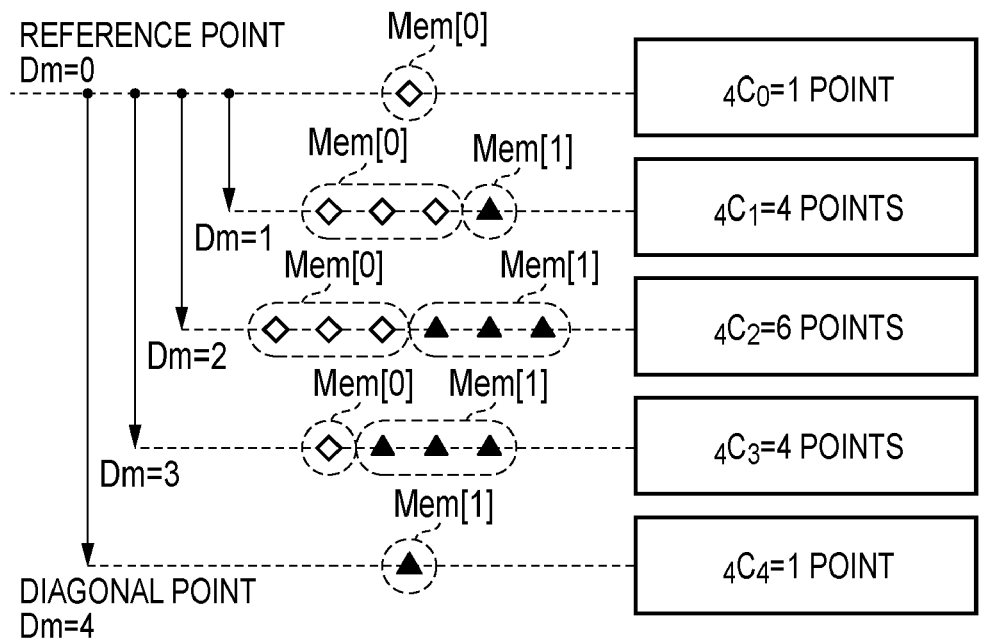
Figure 11C:
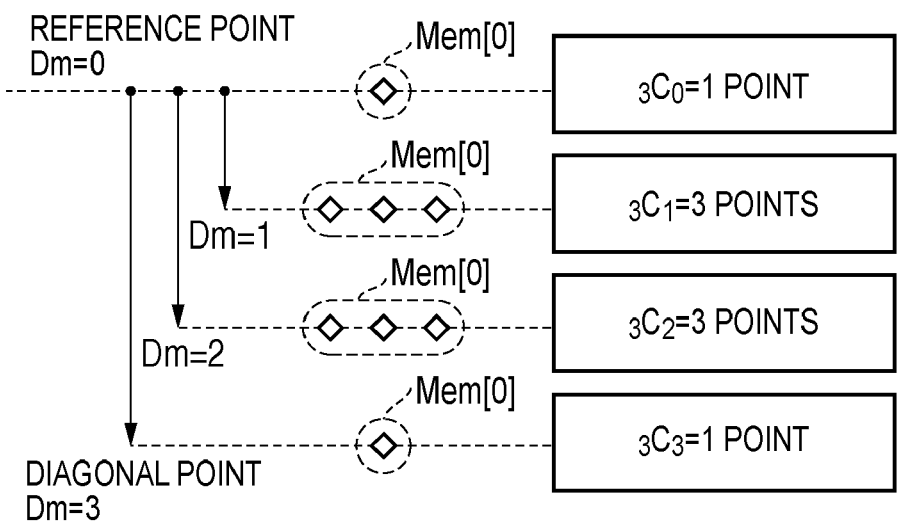

FIG. 11B shows the method of divisionally storing vertex data of the multi-dimensional LUT for a four-dimensional hypertetrahedron interpolation, and data are divisionally stored in Mem[0] and Mem[1]. Note that the divisional storage method shown in FIG. 11B indicates that two cache units need only be used, and a combination of the cache units is not limited to Mem[0] and Mem[1], but Mem[4] and Mem[7] may be used. FIG. 11C shows a case for a three-dimensional tetrahedron interpolation. In this case, one cache unit (for example, Mem[0]) need only be used. In other words, the need for divisional storage of vertex data of the multi-dimensional LUT can be obviated.

Generation of Read Address Signal

A read address generation method will be described below with reference to FIGS. 12A and 12B.

Figure 12A:
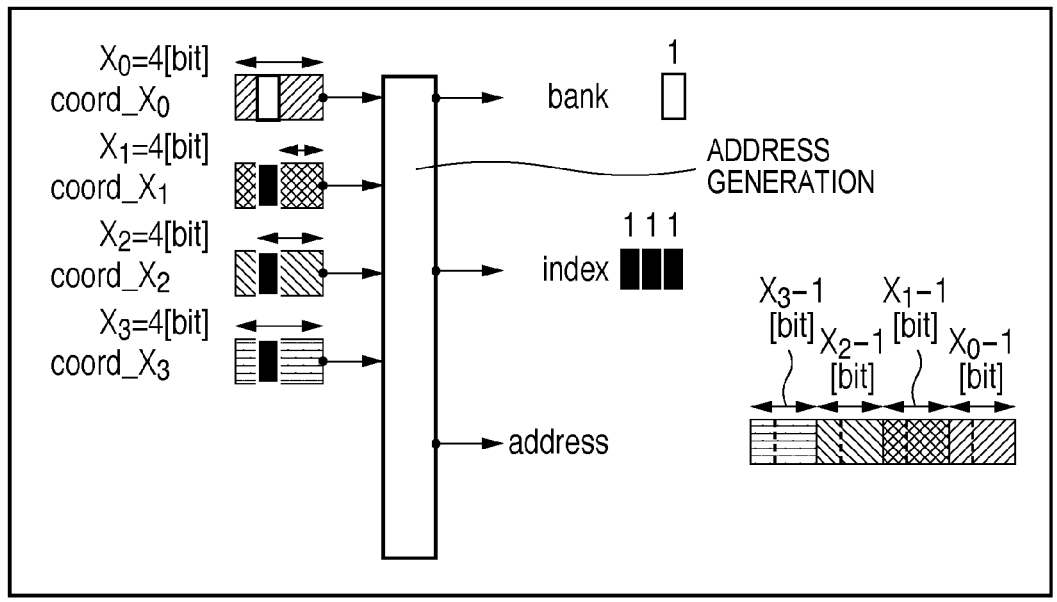
FIGS. 12A and 12B are views for explaining a read address signal generation method in a low-dimensional tetrahedron interpolation.
Figure 12B:
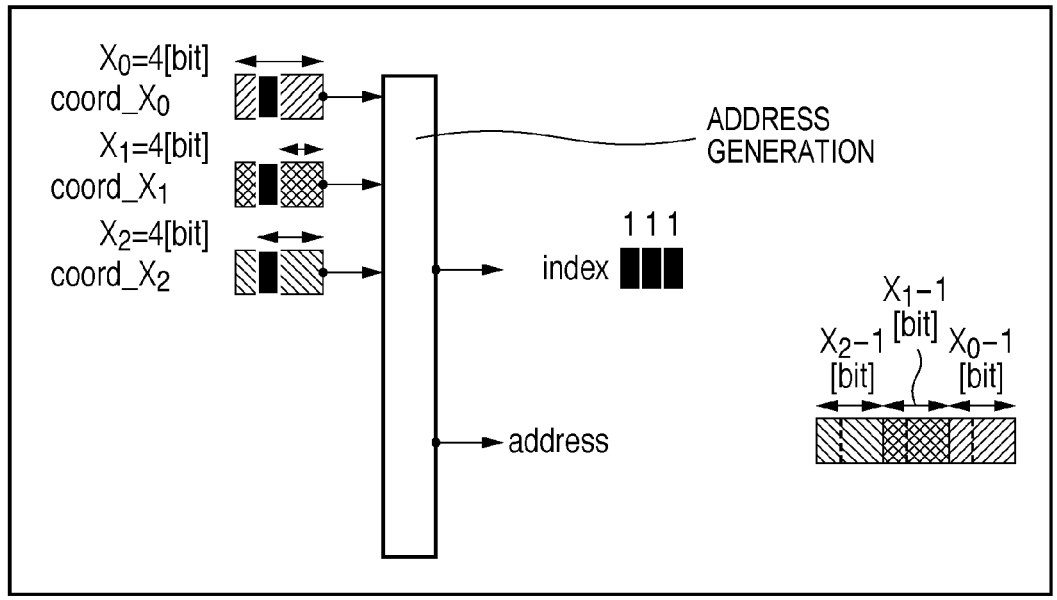

FIG. 12A shows the generation method of read address signals for the four-dimensional hypertetrahedron interpolation, and FIG. 12B shows the generation method of read address signals for the three-dimensional tetrahedron interpolation. The read address signals are generated basically in the same sequence as that for the six-dimensional hypertetrahedron interpolation, but the number of components of a coordinate signal to be used is six in case of six dimensions, but it is four in case of four dimensions and is three in case of three dimensions. Upon implementation of a low-dimensional tetrahedron interpolation, an index signal is calculated in preference to a bank signal to attain the same functions of the cache units. That is, the index signal always has a 3-bit length, but the bank signal is decided by N−3 bits according to the number of dimensions of the tetrahedron interpolation. That is, the bank signal becomes short for low dimensions, and becomes long for high dimensions.

As described above, using some resources of the apparatus for the six-dimensional hypertetrahedron interpolation, an apparatus for a low-dimensional tetrahedron interpolation such as three- or four-dimensional interpolation can be implemented. In this case, using minimum required functions, the consumption power of the apparatus for the tetrahedron interpolation can be reduced according to the number of dimensions.

Modification of Embodiment

Figure 9C:
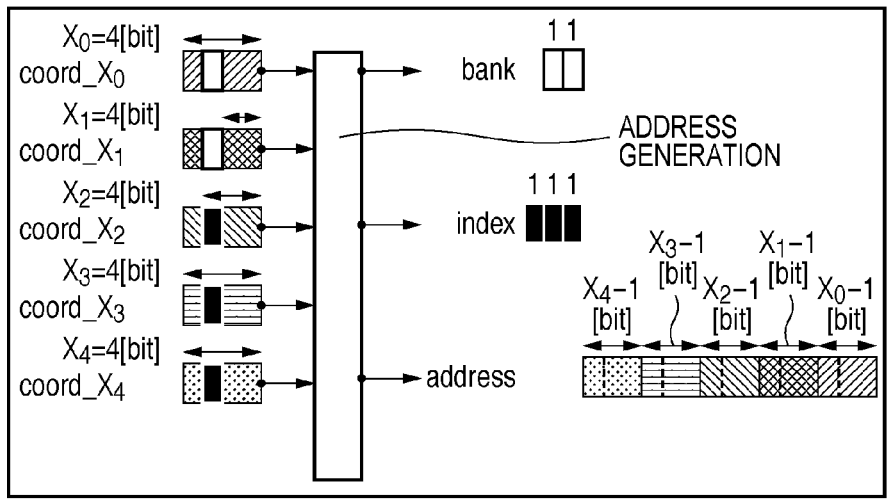

FIG. 9C shows the read address signal generation method for a five-dimensional tetrahedron interpolation, and FIG. 11A shows the divisional storage method of vertex data of the multi-dimensional LUT for a five-dimensional hypertetrahedron interpolation. That is, as for the five-dimensional tetrahedron interpolation, vertex data can be similarly divisionally stored based on combinations of addresses and indices in correspondence with a maximum of eight cache units. Note that arbitrary four out of the eight cache units can be used.

As described above, the aforementioned color processing apparatus can cope with three- to six-dimensional tetrahedron interpolations without changing the arrangement of the multi-dimensional LUT unit 154. Also, the apparatus can scalably cope with multi-dimensional tetrahedron interpolations by increasing the number of cache units to be incorporated. That is, in an apparatus for an N($\geqq$3, an integer)-dimensional tetrahedron interpolation, vertex data are divisionally stored in $2^{N-3}$ cache units, and a maximum of four vertex data are parallelly obtained from one cache unit to make interpolation computations.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-167475, filed Jul. 26, 2010, which is hereby incorporated by reference herein in its entirety.

What is claimed is:

1. A color processing apparatus for making interpolation computations of output signals for N≧3, an integer)-dimensional vector signals which represent an image using a lookup table and an N-dimensional tetrahedron interpolation or hypertetrahedron interpolation, comprising:
   a divider, configured to divide N components included in the N-dimensional vector signals into upper bit signals and lower bit signals;
   a plurality of memories which divisionally store output signals corresponding to vertices of unit solids or unit hypersolids which configure the lookup table in eight-vertex units;
   a memory controller, configured to control the plurality of memories to obtain output signals of vertices of the unit solid or the unit hypersolid corresponding to a combination of the upper bit signals of the N components; and
   a computing section, configured to make the interpolation computations of the output signals for the N-dimensional vector signals based on the obtained output signals and the lower bit signals of the N components.

2. The apparatus according to claim 1, wherein the memory controller comprises:
   a setting section, configured to arbitrarily set a bit position;
   a selector, configured to arbitrarily select three components from N components which represent coordinates of vertices of the unit solid or the unit hypersolid required for the interpolation computations, which are decided based on the upper bit signals and the lower bit signals of the N components; and
   a determiner, configured to extract 1 bit at the bit position from each of the selected three components, and to determine storage positions of the eight-vertex unit output signals using the extracted 3 bits.

3. The apparatus according to claim 2, wherein the memory controller further comprises a decider configured to extract 1 bit at the bit position from each of components other than the selected three components, and to decide memories used to store the eight-vertex unit output signals using the extracted N−3 bits from said plurality of memories.

4. The apparatus according to claim 1, wherein the number of output signals used in the interpolation computations of the eight-vertex unit output signals is a maximum of four.

5. The apparatus according to claim 1, wherein one entry of the memory is configured by the eight-vertex unit output signals.

6. The apparatus according to claim 1, wherein the memory controller uses $2^{N-3}$ memories of said plurality of memories.

7. A method of making interpolation computations of output signals for N(≧3, an integer)-dimensional vector signals which represent an image using a lookup table and an N-dimensional tetrahedron interpolation or hypertetrahedron interpolation, the method comprising:
   using a processor to perform the steps of:
   dividing N components included in the N-dimensional vector signals into upper bit signals and lower bit signals;
   divisionally storing output signals corresponding to vertices of unit solids or unit hypersolids which configure the lookup table in eight-vertex units to a plurality of memories;
   controlling the plurality of memories to obtain output signals of vertices of the unit solid or the unit hypersolid corresponding to a combination of the upper bit signals of the N components; and
   making the interpolation computations of the output signals for the N-dimensional vector signals based on the obtained output signals and the lower bit signals of the N components.

* * * * *